April 11, 1933.  J. B. WHITLOW  1,903,662
TRANSMISSION MECHANISM
Filed April 7, 1932   2 Sheets-Sheet 1
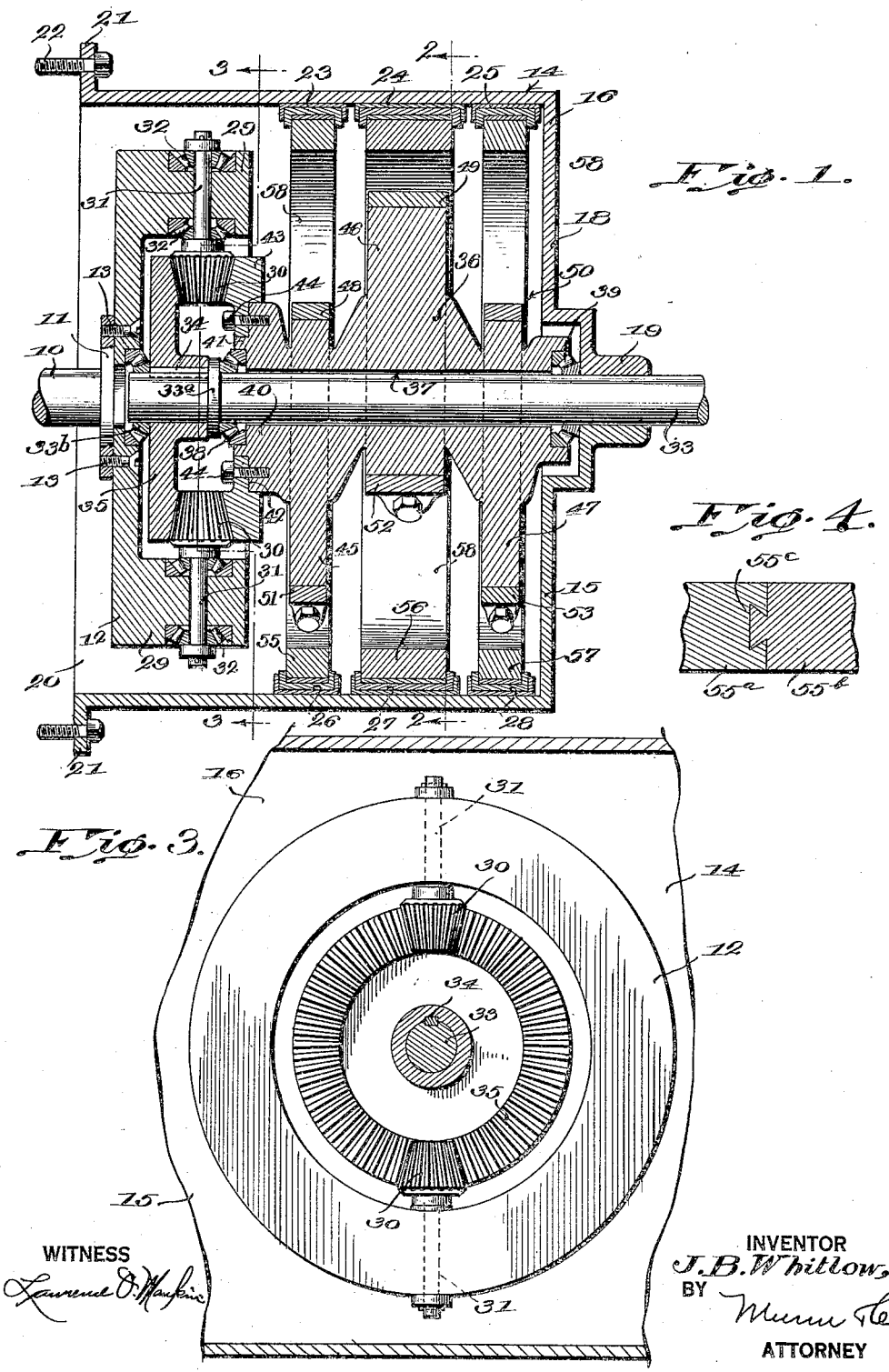

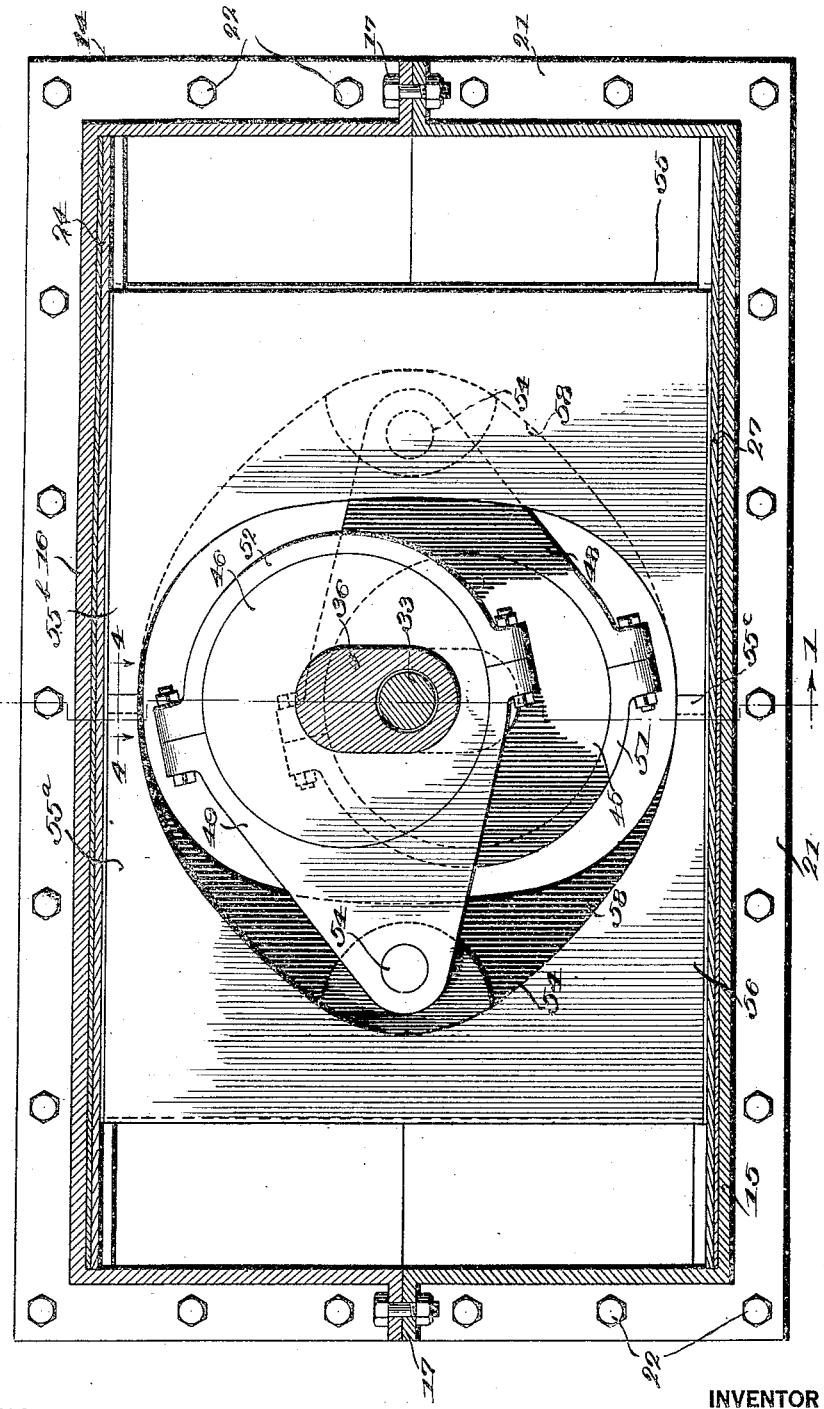

Patented Apr. 11, 1933

1,903,662

UNITED STATES PATENT OFFICE

JOHN B. WHITLOW, OF LEXINGTON, KENTUCKY

TRANSMISSION MECHANISM

Application filed April 7, 1932. Serial No. 603,865.

My invention relates to transmission mechanisms and it consists in the constructions, arrangements and combinations herein described and claimed.

It is an object of my invention to provide a transmission mechanism particularly designed for use on automobiles and the like and has as one of its features the provision of a mechanism which will eliminate the use of a clutch and gear shifting mechanism.

It is a further object of the invention to provide a novel structure interposed between the driving and driven members whereby power may be transmitted to the driven member in an automatic manner.

It is a still further object of the invention to provide an automatic transmission mechanism embodying a novel structure in the form of weight members for effecting motion between the drive and driven members.

A still further object of the invention is the provision of weight members within the transmission mechanism for producing a dynamically and statically balanced drive, free from vibrations.

Additional objects, advantages and features of invention will be apparent from the following description and accompanying drawings forming a part of this application, wherein:

Figure 1 is a cross sectional view of my transmission,

Fig. 2 is a cross section on the line 2—2 of Fig. 1;

Fig. 3 is a cross section on the line 3—3 of Fig. 1; and

Fig. 4 is a fragmentary cross section on the line 4—4 of Fig. 2.

In carrying out my invention, I employ an internal combustion engine (not shown) embodying a drive shaft 10 suitably flanged at 11 for mounting a fly wheel 12, as indicated at 13.

A suitable housing 14 is provided and as seen in Fig. 2 this housing is rectangular in cross section, and preferably is formed from two sections 15 and 16, bolted together as at 17. The housing 14 has an end wall 18, medially of which I provide a bearing 19. The opposite end of the casing is open, as at 20 and has a circumscribing flange 21, suitably apertured to receive bolts 22 for mounting of the housing to the engine.

The two sections 15 and 16 of the casing are provided with track ways 23, 24 and 25 and 26, 27 and 28 respectively, arranged in opposed relation and constituting guide ways for weight members presently to be described.

The fly wheel 12 is formed with a flange 29 having pinion gears 30 journalled on axles 31 which project inwardly in the direction of center of the fly wheel. As shown, the axles 31 may be mounted in ball bearing assemblies 32.

A driven shaft 33 supported in the bearing 19 of the casing is provided, one end thereof being journalled in a bearing assembly $33^b$ of the flywheel, and upon the driven shaft there is keyed as at 34 a bevelled gear 35, which meshes with the pinion gears 30.

The shaft 33 includes a collar $33^a$ which as shown in Fig. 1 is positioned between the bearing 38 and gear 35, thus preventing longitudinal movements of the shaft 33.

Revolubly supported by the driven shaft 33 there is a crank shaft 36 having a longitudinal bore 37 for reception of the shaft 33, as clearly shown in Fig. 1. The crank shaft 36 is supported at its front and rear ends by roller bearings 38 and 39. The front end 40 of the crank shaft has an annular flange 41 forming a seat 42 for a bevelled ring gear 43. The ring gear 43 is adapted to mesh with the pinion gears 30, as shown, and this gear may be secured to the crank shaft in any suitable manner, as by bolts 44.

The crank shaft 36 is provided with three eccentrics 45, 46 and 47, the eccentrics 45 and 47 being set at 180 degrees to the eccentric 46. By arranging the eccentrics in this manner, the crank shaft will be dynamically and statically balanced, reducing vibrations thereof to a minimum.

The eccentrics 45, 46 and 47 are of the same diameter, but it will be noted by reference to Fig. 1 that the eccentric 46 is of greater width than the eccentrics 45 and 47, and consequently is of greater weight, which arrangement together with the weight members to be described, will tend to equalize the strain and torque upon the driven shaft and other portions of the transmission mechanism.

Each eccentric 45, 46 and 47 is provided with connecting rods 48, 49 and 50. The rods, in the present instance, comprise respective head portions 51, 52 and 53 circumscribing and revolubly fixed to the eccentrics. Each connecting rod is pivotally connected as at 54 to respective sliding weights 55, 56 and 57. The weights 55—57 are of rectangular shape and are supported between respective trackways 23—26; 24—27; and 25—28.

The eccentrics 45—47 rotate in the same vertical plane as that occupied by their respective sliding weights, and therefore, the weights 55—57 are cut away as at 58, to accommodate the throw of the cranks associated with the eccentrics.

In order to facilitate assembly of the weights upon the crank shaft 36 and disposition within the guide ways 23—28, the weights 55—57 may be formed in two parts 55a and 55b. The connection between these two parts may be in the form of a dove-tail joint 55c, as clearly shown in Fig. 4.

The operation of my transmission will be readily understood from the following description.

We will assume that a motor vehicle equipped with my transmission is at a standstill, with the motor idling. During the idling of the motor, the fly wheel 12 will revolve due to its association with the drive shaft 10, and since the pinion gears 30 are mounted upon the fly wheel they will be carried around therewith. As previously explained the pinion gears 30 are in mesh with the gear 35, but since the gear 35 is held stationary due to its connection with the driven shaft 33, the gears 30 rotate upon their axles 31. The pinion gears 30 are also in mesh with the ring gear 43 which is secured to the crank shaft 36, causing the ring gear 43 to rotate, and by such rotation turn the crank shaft 36. The speed of rotation of the gear 43 is approximately twice that of the fly wheel. The rotation of the crank shaft 36 causes the weights 55, 56 and 57 to slide back and forth in their respective guide ways, as will be apparent.

During idling of the motor, no great resistance is set up by the weights 55—57, but upon accelerating the motor up to say 1000 revolutions per minute, the oscillations of the weights are increased correspondingly, since the speed of the crank shaft 36 has been brought up to a similar speed. This increasing speed of oscillation is greatly resisted by the weights 55—57, which resistance is passed from the connecting rods to respective eccentrics of the crank shaft 36; the ring gear 43 and the pinion gears 30. The pinion gears 30 being in mesh with the bevel gear 35 transmits a torque to said gear 35 until its resistance is less than the resistance of the weights, which will cause the gear 35 to turn. Upon rotation of the gear 35, it will be apparent that the shaft 33 will be rotated, which of course, being associated with the differential of the car will drive the car forwardly.

With the motor turning at a constant number of revolutions per minute, for every revolution per minute, the gear 35 gains as the car picks up, the crank shaft 36 is reduced in speed one revolution per minute, and consequently reducing the oscillating speed of the weights thereby reducing the torque set up by the weights on the gear 35.

After the car has been put into motion, a deceleration of the motor relieves the torque upon the gear 35, thereby permitting the car to free-wheel.

From the foregoing it will be seen that I have provided an automatic transmission mechanism of simplified construction, obviating the need for gear shifting mechanism, as any increase in the speed of the gear 35 due to increase in speed of the motor will produce a correspondingly greater speed of the vehicle.

While I have shown and described a preferred embodiment of the invention I do not limit myself to the exact constructions shown, and reserve as my own all such modifications, as fairly fall within the scope of the appended claims.

I claim:

1. The combination of a rotatable driving member having a fly wheel, a shaft to be driven, a casing enclosing said fly wheel and revolubly supporting said driven shaft, pinion gears carried by said fly wheel, a ring gear fixed to said driven shaft and in mesh with said pinion gears, a hollow crank shaft revolubly mounted upon said driven shaft, said crank shaft having eccentric members, guide ways carried by said casing, weight members slidably supported within respective guide ways, the guideways having a fixed position in the housing, connecting rods associated with respective eccentrics and weight members, and a ring gear carried by said crank shaft and in mesh with said pinion gears whereby to rotate said crank shaft to oscillate said weight members.

2. The combination of a rotatable driving member including a fly wheel having a flange, a casing enclosing said flywheel, a driven shaft revolubly journalled within said fly wheel and said casing, revoluble pinion gears mounted in the flange of said flywheel, a ring gear fixed to said driven shaft and in mesh with said pinion gears, a hollow crank shaft revolubly mounted upon said driven shaft, said crankshaft having three eccentric members, pairs of opposed guide ways carried by said casing, a weight member oscillatably supported within each pair of guide ways, connecting rods associated with respective eccentrics and weight members, and a ring gear carried by said crank shaft and in mesh with said pinion gears whereby to rotate said crank shaft to oscillate said weight members.

3. The combination of a rotatable driving member including a fly wheel having a flange, a casing enclosing said flywheel, a driven shaft revolubly journalled within said fly wheel and said casing, revoluble pinion gears mounted in the flange of said flywheel, a ring gear fixed to said driven shaft and in mesh with said pinion gears, a hollow crank shaft revolubly mounted upon said driven shaft, said crank shaft having three eccentric members, connecting rods associated with each eccentric, pairs of opposed guide ways mounted within said casing and disposed in the line of travel of said connecting rods, respective weight members oscillatably mounted within said guide ways, said intermediate weight member being of greater weight than said other two weight members, and a ring gear carried by said crank shaft and in mesh with said pinion gears whereby to rotate said crank shaft to oscillate said weight members.

JOHN B. WHITLOW.